United States Patent
Blakesley

(10) Patent No.: US 6,407,350 B1
(45) Date of Patent: Jun. 18, 2002

(54) LAMINATED BEAM WEIGHT SENSOR

(75) Inventor: Patrick B. Blakesley, Goshen, IN (US)

(73) Assignee: CTS Corporation, Elkhart, IN (US)

( * ) Notice: Subject to any disclaimer, the term of this patent is extended or adjusted under 35 U.S.C. 154(b) by 59 days.

(21) Appl. No.: 09/649,336

(22) Filed: Aug. 28, 2000

Related U.S. Application Data

(63) Continuation-in-part of application No. 09/422,382, filed on Oct. 21, 1999.

(51) Int. Cl.[7] .............................. G01G 3/14; G01G 3/08
(52) U.S. Cl. ................. 177/211; 177/229; 73/862.632; 73/862.634
(58) Field of Search ...................... 73/862.041, 862.042, 73/862.043, 862.044, 862.045, 862.046, 862.632, 862.633, 862.634, 862.639; 177/211, 229

(56) References Cited

U.S. PATENT DOCUMENTS

| | | | | |
|---|---|---|---|---|
| 4,396,079 A | * | 8/1983 | Brendel ...................... 177/211 |
| 4,739,848 A | * | 4/1988 | Tulloch ...................... 177/211 |
| 4,785,673 A | * | 11/1988 | Aumard ...................... 177/211 |
| 5,222,398 A | * | 6/1993 | O'Brien ...................... 177/211 |
| 5,327,791 A | * | 7/1994 | Walker ...................... 177/211 |
| 5,512,713 A | * | 4/1996 | Naito et al. .................. 177/211 |
| 5,539,158 A | * | 7/1996 | Utsunomiya et al. ....... 177/211 |
| 5,573,269 A | | 11/1996 | Gentry et al. ................ 280/735 |
| 5,629,488 A | | 5/1997 | Kropp ...................... 73/862.68 |
| 5,756,943 A | * | 5/1998 | Naito et al. .................. 177/211 |
| 5,810,392 A | | 9/1998 | Gagnon ....................... 280/735 |
| 5,865,463 A | | 2/1999 | Gagnon et al. ............. 280/735 |
| 5,906,393 A | | 5/1999 | Mazur et al. ............... 280/735 |
| 5,942,695 A | | 8/1999 | Verma et al. ................ 73/768 |
| 5,971,432 A | | 10/1999 | Gagnon et al. ............. 280/735 |
| 5,986,221 A | | 11/1999 | Stanley ....................... 177/136 |
| 5,997,033 A | | 12/1999 | Gray et al. ................. 280/735 |
| 6,039,344 A | | 3/2000 | Mehney et al. ............. 280/735 |
| 6,054,761 A | | 4/2000 | McCormack et al. ....... 257/698 |
| 6,225,576 B1 | * | 5/2001 | Poole et al. ................ 177/211 |

FOREIGN PATENT DOCUMENTS

GB 2 343 953 A 11/1998

* cited by examiner

Primary Examiner—Randy W. Gibson
(74) Attorney, Agent, or Firm—Mark P. Bourgeois; Mark W. Borgman

(57) ABSTRACT

A weight sensor for sensing an applied weight. The sensor includes a first and second outer substrate that have a first and second end and an inner surface and an outer surface. The first and second outer substrates are fixedly attached together. Several strain gauge resistors are located on the outer surfaces of the first and second outer substrates to generate an electrical signal in response to the substrate being stressed by the applied weight. The electrical signal changes as a function of the applied weight. The sensor is useful in measuring the weight of a vehicle seat occupant.

10 Claims, 1 Drawing Sheet

LAMINATED BEAM WEIGHT SENSOR

CROSS REFERENCE TO RELATED AND CO-PENDING APPLICATIONS

This application is a continuation in part (CIP) of U.S. patent application Ser. No. 09/422,382, filed Oct. 21, 1999 and titled, "Vehicle Seat Weight Sensor".

This application is related to the following U.S. patent applications: U.S. patent application Ser. No. 09/374,874, filed Aug. 16, 1999 and titled, "Automobile seat weight Sensor".

U.S. patent application Ser. No 09/374,870, filed Aug. 16, 1999 and titled, "Vehicle Occupant Position Detector and Airbag Control System".

The foregoing patents have the same assignee as the instant application and are herein incorporated by reference in their entirety for related and supportive teachings.

BACKGROUND OF THE INVENTION

1. Field of the Invention

This invention relates to an automobile weight sensor for detecting the presence of a person having a weight in a car seat, and in particular to a sensor that can detect the presence of an occupant using strain sensitive resistors and provide an electrical signal to control activation of an airbag.

2. Description of the Related Art

Various devices are well known for their ability to measure force, pressure, acceleration, temperature, position, etc. by using a sensing structure combined with signal processing electronics. One general type of sensor or transducer for such applications is a resistive strain gauge sensor in which force or pressure is sensed or measured based on strain placed on the resistors. Resistive strain gauges function by exhibiting changes in resistance in response to strain in the resistor.

Many types of strain gauge sensors have been designed and made commercially available. Various strain gauge sensors have proven to be generally satisfactory. Prior art sensors, however, have tended to be rather expensive and not suitable in certain applications such as sensing the presence of an occupant in an automobile seat. A sensor suitable for such an application must be compact, robust, impervious to shock, vibration and enviornmental contaminants and yet inexpensive.

Automobile seats can use sensors to activate air bags, which would be deployed during an accident. Injury to infants or small children from air bag deployment with excessive force is a current industry problem. A weight sensor in the seat can be used to control the deployment force during air bag activation. If a heavy person is in the seat, the airbag is deployed at full force. If a light person is in the seat, such as a child, the airbag is deployed at a slower, less forceful rate or not at all.

A problem with the sensor of U.S. patent application Ser. No. 09/422,382 is that during manufacturing it requires several processing steps. For example, the resistor pattern can only be screened on one side of the substrate and dried at a time. The substrate is screened and cured on one side then inverted to screen the resistors on the other side and then cured again, adding to processing time.

A current unmet need exists for a reliable, low cost, simple and robust automobile weight sensor that is easily manufacturable.

SUMMARY OF THE INVENTION

It is a feature of the invention to provide a reliable and cost-effective weight sensor for detecting applied weight. The sensor is useful in measuring the weight of a vehicle seat occupant. The sensor uses strain sensitive resistors.

An additional feature of the invention is to provide a weight sensor for sensing an applied weight. The sensor includes a first and second outer substrate that have a first and second end and an inner surface and an outer surface. An inner substrate has a first and second end. The first and second outer substrates and the inner substrate are fixedly attached together. Several strain gauge resistors are located on the outer surfaces of the first and second outer substrates to generate an electrical signal in response to the substrate being stressed by the applied weight. The electrical signal changes as a function of the applied weight. The substrate has a neckdown region located between the first and second ends for concentrating the applied weight. The strain gauge resistors are located in the neckdown region.

The invention resides not in any one of these features per se, but rather in the particular combination of all of them herein disclosed and claimed and it is distinguished from the prior art in this particular combination of all of its structures for the functions specified. Other features of the present invention will become more clear from the following detailed description of the invention, taken in conjunction with the accompanying drawings and claims.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Figure 1:
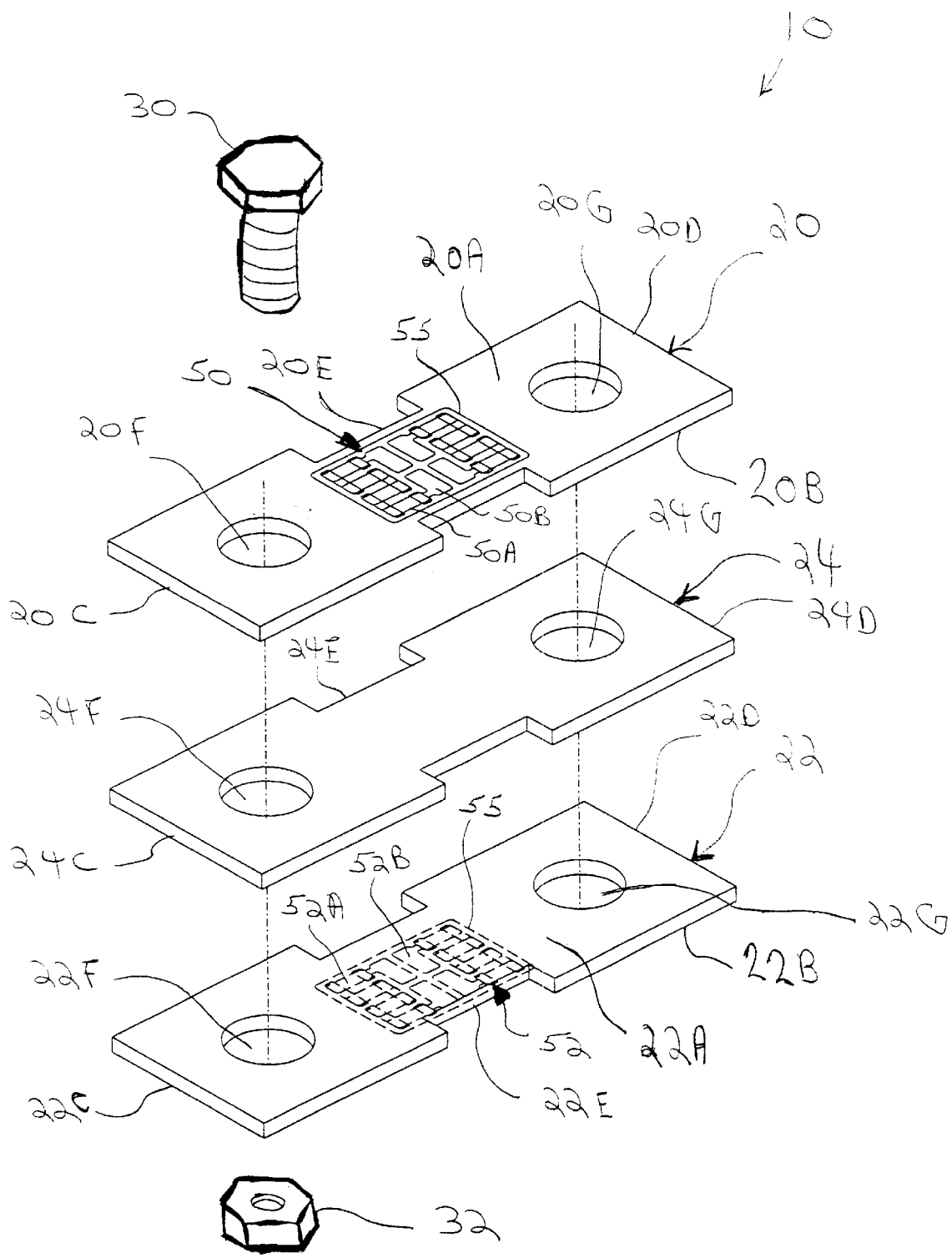
FIG. 1 is a perspective view of a laminated beam weight sensor.

It is noted that the drawings of the invention are not to scale. The drawings are intended to depict only typical embodiments of the invention, and therefore should not be considered as limiting the scope of the invention. The invention will be described with additional specificity and detail through the use of the accompanying drawings. In the drawings like numbering represents like elements between the drawings.

DETAILED DESCRIPTION OF THE PREFERRED EMBODIMENTS

Referring to FIG. 1, a weight sensor 10 is shown. Sensor 10 has a pair of planar outer metal substrates 20, 22 with upper surfaces 20A and 22A and bottom surfaces 20B and 22B. A planar inner substrate 24 is located between outer substrates 20 and 22. Although, only one inner substrate 24 is shown, two or more can be used to get the desired overall thickness or strength. Alternatively, inner substrate 24 can be omitted, if desired. Substrates 20, 22, and 24 are generally elongated and dog boned shaped. Substrate 20, 22 and 24 are preferably formed from 430 stainless steel. Substrate 20 has a first end 20C, a second end 20D and a neckdown region 20E located between first end 20C and second end 20D. The neckdown region is narrower than the first and second ends. Substrate 20 also has a pair of apertures 20F and 20G located in first and second ends 20C and 20D, respectively. Substrate 22 has a first end 22C, a second end 22D and a neckdown region 22E located between first end 22C and second end 22D. Substrate 22 also has a pair of apertures 22F and 22G located in first and second ends 22C and 22D, respectively. Substrate 24 has a first end 24C, a second end 24D and a neckdown region 24E located between first end 24C and second end 24D. Substrate 24 also has a pair of apertures 24F and 24G located in first and second ends 24C and 24D, respectively.

Fasteners such as bolt 30 pass through the apertures 20, 22, 24 F and G, respectively and mate with a nut 32 in order to hold substrates 20, 22 and 24 together as one unit after assembly. Other fasteners such as rivets, screws or welding could also be used. An upper group 50 of several strain gauge resistors 50A are arranged on surface 20A at the junctions of the neckdown region 20E and the first and second ends 20C and 20D, respectively. Conductors 50B are electrically attached to ends of resistors 50A to connect with an external wire or connector (not shown). Similarly, A lower group 52 of several strain gauge resistors 52A are arranged on surface 22B at the junctions of the neckdown region 22E and the first and second ends 22C and 22D, respectively. Conductors 52B are electrically attached to ends of resistors 52A to connect with an external wire or connector (not shown).

An insulative dielectric layer 55 is located under the resistors 50 and 52 and over substrates 20 and 22. Further details on the construction and operation of the resistors are taught in parent U.S. patent application Ser. No. 09/422,382, filed Oct. 21, 1999 and titled, "Vehicle Seat Weight Sensor", the contents of which are specifically herein incorporated by reference.

Inner substrate 24 is placed between outer substrates 20 and 22. Bolts 30 and nuts 32 are used to affix substrates 20, 22, and 24 together so that they act as one unit. In a vehicle seat weight sensing application, sensor 10 would be mounted to a car seat. The bolts 30 would pass though other seat structural members to attach sensor 10 to the car seat.

Resistors 50A and 52A are strain sensitive and will change resistance based on the amount of strain in substrates 20 and 22. A fixed voltage is applied to the resistors. As the strain in the resistors changes with the weight applied to the substrate, the electrical voltage across the resistors changes and is measured.

Sensor 10 can be manufactured using the following process sequence:

1. Screen print dielectric layer 55 on surfaces 20A and 22B of substrates 20 and 22.
2. Curing dielectric layer 55.
3. Screen print conductors 50B and 52B on surfaces 20A and 22B of substrates 20 and 22.
4. Curing conductors 50B and 52B.
5. Screen print resistors 50A and 52A on surfaces 20A and 22B of substrates 20 and 22.
6. Curing resistors 50A and 52A.
7. Invert substrate 22.
8. Stack substrate 24 and 20 on top of substrate 22.
9. Insert bolts 30 through apertures 20, 22, 24 F and G.
10. Screw nuts 32 onto bolts 30 and tighten.
11. Attach wires using solder to conductors 50B and 52B.

Several advantages arise from the manufacturing process of sensor 10. The manufacturing process is simplified. The resistor pattern is screened and cured on substrates 20 and 22 at the same time reducing cycle time. The substrate does not need to be inverted during processing.

Variations of the Preferred Embodiment

The weight sensor shown used a thick film resistor, one skilled in the art will realize that the preferred embodiment would work with other rules of resistors. For example, discrete chip resistors could be attached to substrates 20 and 22 or thin film resistors could be used or foil type strain gauges could be used. Furthermore, the shape of substrates 20, 22 and 24 could be varied to any configuration that would concentrate weight at the desired location on the subtrate.

Although sensor assembly 10 was shown without a housing, it is contemplated to add a housing.

Another variation of the weight sensor would be to utilize other electrical connections. For example, other types of connectors or terminals could be used.

Yet a further variation, would be to place signal conditioning circuitry on one of the substrated to amplify and filter the electrical signal.

While the invention has been taught with specific reference to these embodiments, someone skilled in the art will recognize that changes can be made in form and detail without departing from the spirit and the scope of the invention. The described embodiments are to be considered in all respects only as illustrative and restrictive. The scope of the invention is, therefore, indicated by the appended claims rather than by the foregoing description. All changes which come within the meaning and range of equivalency of the claims are to embraced within their scope.

What is claimed is:

1. A weight sensor for sensing an applied weight comprising:

a) a first and second outer substrate, each having a first and second end and each having an inner surface and an outer surface;

b) at least one inner substrate, having a first and second end, the inner substrate located between the inner surfaces of the first and second outer substrates;

c) at least one fastener fixedly attaching the first and second outer substrates to the inner substrate;

d) a plurality of strain gauge resistors, located on the outer surfaces of the first and second outer substrates, for generating an electrical signal in response to the substrate being stressed by the applied weight, the electrical signal changing as a function of the applied weight; and e) a neckdown region located in the first and second outer substrate, between the first and second ends for concentrating the applied weight, the strain gauge resistors located in the neckdown region.

2. The weight sensor according to claim 1, wherein the resistors are connected to at least one wire for connection to an external electrical circuit.

3. The weight sensor according to claim 1, wherein the resistors are connected to a connector for connection to an external electrical circuit.

4. The weight sensor according to claim 1, wherein the first and second ends have apertures.

5. The weight sensor according to claim 4, wherein the fastener passes through the apertures.

6. The weight sensor according to claim 5, wherein the fastener is selected from the group consisting of:

a) bolts and nuts;

b) screws and nuts;

c) rivets; and d) capscrews.

7. The weight sensor according to claim 1, wherein the substrate is a metal coated with a dielectric layer.

8. The weight sensor according to claim 1, wherein the sensor is attached to a vehicle seat for measuring the weight of a seat occupant.

9. A method of manufacturing a weight sensor comprising the steps of:

a) providing a first, second and third substrate;

b) screen printing a dielectric layer on an outer surface of the first and second substrates;

c) curing the dielectric layer;

d) screen printing conductors on the outer surface of the first and second substrates;

e) curing the conductors;

f) screen printing resistors on the outer surface of the first and second substrates;

g) curing the resistors;

h) stacking the third substrate on top of the first substrate and stacking the second substrate on top of the third substrate; and i) affixing the first, second and third substrates together using a fastener.

10. The method of manufacturing a weight sensor according to claim 9 further comprising:

a) attaching the weight sensor to a vehicle seat for measuring the weight of a seat occupant.

* * * * *